United States Patent [19]
Ohizumi

[11] Patent Number: 5,123,255
[45] Date of Patent: Jun. 23, 1992

[54] MULTI-TYPE AIR-CONDITIONING SYSTEM WITH AN OUTDOOR UNIT COUPLED TO A PLURALITY OF INDOOR UNITS

[75] Inventor: Tomishige Ohizumi, Fujinomiya, Japan

[73] Assignee: Kabushiki Kaisha Toshiba, Kawasaki, Japan

[21] Appl. No.: 677,444

[22] Filed: Mar. 29, 1991

[30] Foreign Application Priority Data

Mar. 30, 1990 [JP] Japan .................. 2-84650

[51] Int. Cl.⁵ .............................................. F25B 7/00
[52] U.S. Cl. ........................................ 62/175; 62/204; 62/209; 165/22
[58] Field of Search ................ 62/203, 204, 208, 209; 165/22

[56] References Cited

U.S. PATENT DOCUMENTS 4,720,982 1/1988 Shimizu et al. .
4,876,859 10/1989 Kitamoto ..................... 62/175

FOREIGN PATENT DOCUMENTS 62-225867 10/1987 Japan .
62-258969 11/1987 Japan .
2194651 3/1988 United Kingdom .
2215867 9/1989 United Kingdom .

*Primary Examiner*—Albert J. Makay
*Assistant Examiner*—John Sollecito
*Attorney, Agent, or Firm*—Cushman, Darby & Cushman

[57] ABSTRACT

On each refrigerant piping to an indoor heat exchanger of each indoor unit, there is provided a flow control valve of which target opening ($\theta t$) is selected separately according to an air-conditioning load of each indoor unit. Provided, the flow control valve which will have a maximum target opening ($\theta t_{max}$) selected, is fully opened, with the remaining flow control valves having such an opening greater than each of respective target openings ($\theta t$) by a given value ($\Delta \theta$). Meanwhile, a target frequency (Ft) of output power from an inverter is selected, following the total of air-conditioning loads of respective indoor units; provided, an actual frequency (F) of output power of the inverter is selected in such a value lower than the target frequency (Ft) by a given value ($\Delta F$).

3 Claims, 12 Drawing Sheets

MULTI-TYPE AIR-CONDITIONING SYSTEM WITH AN OUTDOOR UNIT COUPLED TO A PLURALITY OF INDOOR UNITS

FIELD OF THE INVENTION

1. Field of the Invention

The present invention relates to a multi-type air-conditioning system serviceable for air-conditioning in plural rooms.

2. Description of the Related Art

Generally, the multi-type air-conditioning system comprises one outdoor unit and a plurality of indoor units which are coupled to said outdoor unit via one distributor unit.

Each of said indoor unit calculates the difference between a room temperature and a set temperature as a air-conditioning load, and subsequently outputs the calculation obtained for the air-conditioning load to the distributor unit.

The distributor unit add up the respective air-conditioning loads thus calculated to figure out a total load of air-conditioning, then selects a target frequency (of inverter output current) corresponding to the total load, and successively outputs the numeric data of said selected target frequency to the outdoor unit.

The outdoor unit consists of a capacity-variable compressor, an electric motor to drive the compressor, and an inverter which outputs a drive current to the motor, and controls an inverter output, following the command (total air-conditioning load) from the distributor unit.

The inverter rectifies the current from an AC power source and outputs a power of a given frequency, whereby the capacity of cooling or heating corresponding to the air-conditioning load of indoor unit will be assured.

An example of such a multi-type air-conditioning system is disclosed in U.S. Pat. No. 4,720,982 issued to Shimizu et al. Said disclosed air-conditioning system is of a configuration wherein a distributor unit (B) is installed with flow control valves (61) and (62), whereby the flows of refrigerant running through each of indoor units (C) and (D) are controlled according to the load of air-conditioning on the part of said each of indoor units (C) and (D).

Other examples of a multi-type air-conditioning system are also disclosed respectively in Japanese Patent Application Laid-Open Nos. 62-225867 and 62-258969.

The machine disclosed in Japanese Patent Application Laid-Open No. 62-225867 likewise has a distributor unit equipped with flow control valves (61) and (62), as with the machine in U.S. Pat. No. 4,720,982 issued to Shimizu et al., so that the flow of refrigerant running through each of indoor units (C) and (D) may be controlled, following the air-conditioning load of each of indoor units (C) and (D). Provided with the former machine, the load of air-conditioning on each part of indoor units (C) and (D) is compensated for according on each part of indoor units (C) and (D) is compensated for according to the ratio between the capacity of an indoor heat exchanger (31) or (32) whichever is concerned, and the capacity of an outdoor heat exchanger (3).

Meanwhile the machine disclosed in Japanese Patent Application Laid-Open No. 62-258969 is of such a system configuration wherein, the opening of each of solenoid driven expansion valves (11a), (11b), and (11c) is regulated according to the temperature of refrigerant's super heat from each of indoor heat exchangers (10a), (10b) and (10c). Further, the opening of each of the solenoid driven expansion valves (11a), (11b), and (11c) is made up for according to the difference between the temperature of each of the indoor heat exchangers (10a), (10b), and (10c), and the temperature of each room.

It must be noted that the flow control valves and the solenoid-driven expansion valves used in this air-conditioning machines are appreciated as respective flow resistance inside a refrigerant piping during a refrigeration cycle.

These flow resistance make up a load due to be imposed on a compressor, thereby causing major factor to increase the consumption of power. Therefore, from the view point of energy saving, it is strongly desired that these flow resistance be lessened.

SUMMARY OF THE INVENTION

The object of the present invention is to decrease the flow resistance which each flow control valve provides, whereby the consumption of power may be lessened for further energy saving.

The multi-type air conditioning unit of the present invention including one outdoor unit and a plurality of indoor units coupled thereto comprises: an inverter outputting power of a given frequency and which is installed in the outdoor unit; a compressor motor starting to run in response to the output from the inverter, capable of varying the running speed according to the frequency of an inverter output, and which is installed in the outdoor unit; a capacity-variable compressor driven by the compressor motor to take in, compress and deliver the compressed refrigerant, and which is installed in the output unit; an outdoor heat exchanger interchanging the heat of inflow refrigerant with the heat of outside air, and which is mounted in the outdoor unit; a plurality of indoor heat exchangers, each interchanging the heat of inflow refrigerant with the heat of indoor air, and which is mounted in respective the indoor units; a plurality of flow control valves, each to regulate the flow of refrigerant running through each of the plurality of indoor heat exchangers; a refrigeration cycle with the compressor, the outdoor heat exchanger, the plurality of flow control valves, and the plurality of indoor heat exchanges coupled together and held in combined service; means to detect an air-conditioning load on the part of each of the indoor units; means to separately set a target opening ($\theta t$) of each of the flow control valves according to each the air-conditioning load; means to fully open the flow control valve which will have a maximum target opening of $\theta t_{max}$ out of individual the target openings of $\theta t$; means to increase the actual opening of each of the flow control valves, other than that to be fully opened, by a given valve ($\Delta\theta$) in reference to the target opening of $\theta t$; means to select a target frequency (Ft) of the current output from the inverter, following the total of the respective air-conditioning loads; and means to decrease an actual frequency (F) of the inverter's output current by a given value ($\Delta F$) in reference to the target frequency (Ft).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Now with reference to the drawings, the first preferred embodiment of the present invention is described hereunder.

Figure 1:
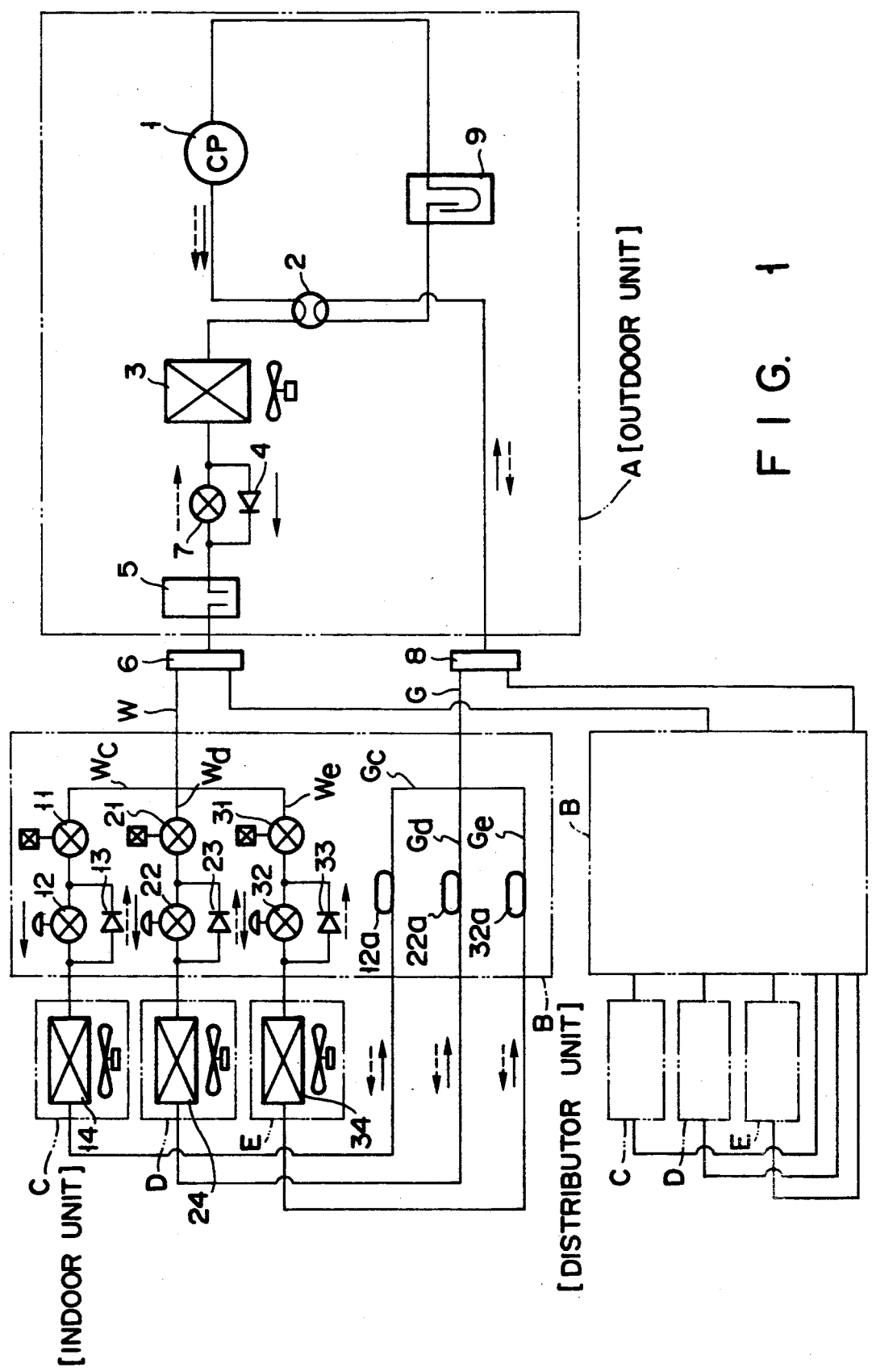
FIG. 1 illustrates how the refrigeration cycles respectively of the first, second, third, and fourth preferred embodiments of the present invention are composed.

Reference is made to FIG. 1 wherein (A) denotes an outdoor unit to which a distributor unit (B) is coupled via piping. To this distributor unit (B) are coupled a plurality of indoor units (C), (D), and (E) through the piping. Namely, the distributor unit (B) is interposed between the outdoor unit (A) and a plurality of indoor units (C), (D), and (E).

A heat pump type refrigeration cycle is made up with the outdoor unit (A), distributor unit (B), and indoor units (C), (D), and (E) coupled together and held combined service.

The outdoor unit (A) is installed with a capacity-variable compressor (1) which takes in refrigerant from a suction port, compresses the refrigerant, and releases said compressed refrigerant from a discharge port.

Coupled to the suction port of the compressor (1) via a 4-way valve (2) is an outdoor heat exchanger. The outdoor heat exchanger interchanges the heat of inflow refrigerant with the heat of outdoor air.

A liquid tank (5) is connected to the outdoor heat exchanger (3) through a forward directional check valve (4), and coupled to this liquid tank (5) is a header (6).

An expansion valve (7) is coupled between the liquid tank (5) and the outdoor heat exchanger (3).

A liquid-side piping (W) is connected to said header (6), and this piping (W) divides into three branches (Wc), (Wd), and (We).

via flow control valves (11), (21), and (31), and expansion valves (12), (22), and (32), indoor heat exchangers (14), (24), and (34) respectively of the indoor units (C), (D), and (E) are coupled to the liquid-side branch pipings (Wc), (Wd), and (We). Each of the indoor heat exchangers (14), (24), and (34) interchanges the heat of inflow refrigerant with the heat of indoor air.

Forward directional check valves (13), (23), and (33) are coupled, respectively, between the indoor heat exchangers (14), (24), and (34), and the flow control valves (11), (21), and (31).

Gas-side piping (Gc), (Gd), and (Ge) are coupled, respectively, to the indoor heat exchangers (14), (24), and (34).

The liquid-side piping (Gc), (Gd), and (Ge) are joined together to a gas-side piping (G) which is coupled to a header (8). Via said 4-way valve (2) and an accumulator (9), the header (8) is coupled to the suction port of the compressor (1).

When the 4-way valve (2) does not work, refrigerant flows in the direction given by a solid line arrow in the figure, whereby the refrigeration cycle is set up. Meanwhile, change-over of the 4-way valve (2) from a point for the refrigeration cycle to another point entails setting up a heating cycle with refrigerant flowing in the direction specified by a dot line arrow in the figure.

The distributor unit (B) has heat sensing elements (12a), (22a) and (32a) respectively to its gas-side pipings (Gc), (Gd), and (Ge).

The heat sensing elements (12a), (22a), and (32a) are accessory parts to the expansion valves (12), (22), and (32).

The expansion valves (12), (22), and (32) each detect a differential temperature between the temperature sensed by each of the heat sensing element, and the temperature of refrigerant flowing through each of said expansion valves. Namely with each of these heat sensing elements, a super heat temperature of refrigerant running through each of the indoor heat exchanges (14), (24), and (34) is detected. Further, the expansion valves (12), (22), and (32) each work to control the flow of refrigerant running through each of outdoor heat exchangers (14), (24), and (34) so that the super heat temperature detected respectively by the expansion valves (12), (22), and (32) will be constant commonly.

Figure 2:
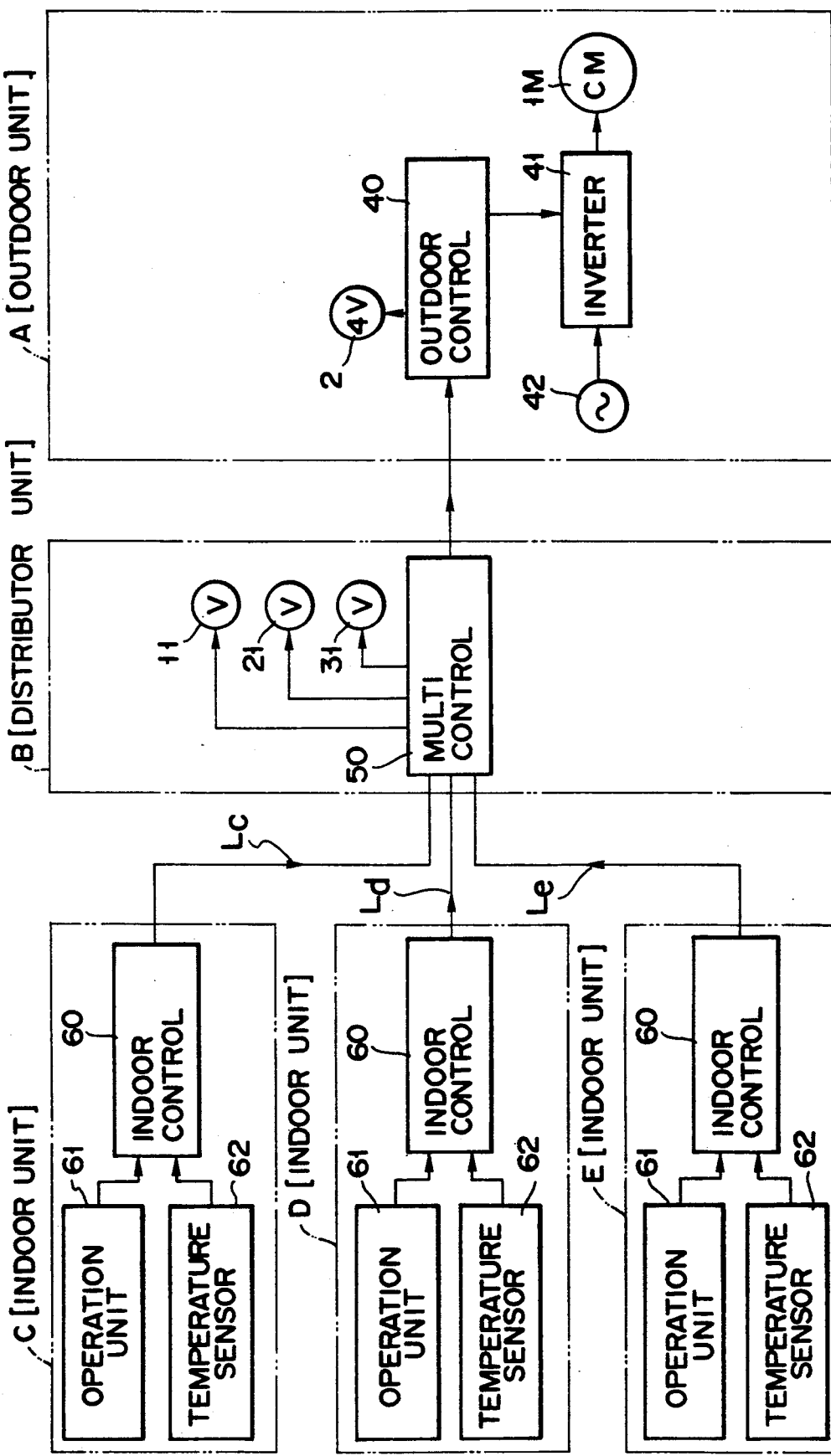
FIG. 2 is a block diagram showing the arrangement of a control circuit used in each preferred embodiment of the present invention.

FIG. 2 presents a control circuit.

The outdoor unit (A) is equipped with an outdoor control (40) comprising a microcomputer and its peripheral control circuit.

Via a signal transmission line, a multi-control (50) is of the distribution unit (B) coupled to the outdoor control (40) and comprises a microcomputer and its peripheral control circuit.

Through respective signal lines, indoor control (60) of the indoor units (C), (D), and (E) are coupled to the multi-control (50). Each of these indoor controls (60) comprises a microcomputer and its peripheral control circuit.

Both the 4-way valve (2) and the inverter (41) are connected to the outdoor control (40).

The inverter (41) converts a current of a commercial-use AC power source to provide power of a given frequency following the command from the outdoor control (4) and then outputs said converted current. The output of the inverter (41) is fed to a compressor motor (1M) as drive power.

Flow control valves (11), (21), and (31) are connected to the multi-control (50).

Coupled to each of the indoor controls (60) are a selector (61) and a temperature sensor (62).

The temperature sensor (62) detects an indoor temperature.

The indoor control (60) of the indoor unit (C) has a functional means described in (1) below:
(1) means to calculate the difference between the temperature detected by the temperature sensor (62) and the temperature set by the selector (61) as an air-conditioning load (Lc), and then transmit the calculation thereof to the multi-control (50).

The indoor control (60) of the indoor unit (D) has a functional means described in (2) below:
(2) means to calculate the difference between the temperature detected by the temperature sensor (62) and the temperature set by the selector (61) as an air-conditioning load (Ld) and then transmit the calculation thereof to the multi-control (50).

The indoor control (60) of the indoor unit (E) has a functional means described in (3) below:
(3) means to calculate the difference between the temperature detected by the temperature sensor (62), and the temperature set by the selector (61) as an air-conditioning load (Le), and then transmit the calculation thereof to the multi-control (50).

The multi-control (50) is furnished with the following functional means (4) through (9) specified below:
(4) means to separately select a target opening ($\theta t$) (%) for each of the flow control valves (11), (21), and (31) according to each of the air-conditioning loads (Lc), (Ld), and (Le) of the respective indoor units (C), (D), and (E).
(5) means to fully open the flow control valve which will have a maximum target opening of $\theta t_{max}$ selected from individual target opening ($\theta t$).
(6) means to increase an actual opening ($\theta$) of each of those flow control valves other than that which is to be fully opened, by a given value ($\Delta \theta$) in reference to each of individual target openings ($\theta t$).
(7) means to detect the total of air-conditioning loads (Lc), (Ld), and (Le) respectively of the indoor units (C), (D), and (E).
(8) means to select a target frequency (Ft) of the current output from the inverter (41) of the outdoor unit (A) according to a detected total of the respective air-conditioning loads.
(9) means to decrease an actual frequency (F) of the current output from the inverter (41) by a given value ($\Delta F$) in reference to the target frequency (Ft) in line with the increase in opening of the flow control valves (11), (21), and (31).

The outdoor control (40) is furnished with a functional means described in (10) below:
(10) means to control the actual frequency (F) of the current output from the inverter (41) according to the command from the distributor unit (B).

Figure 3:
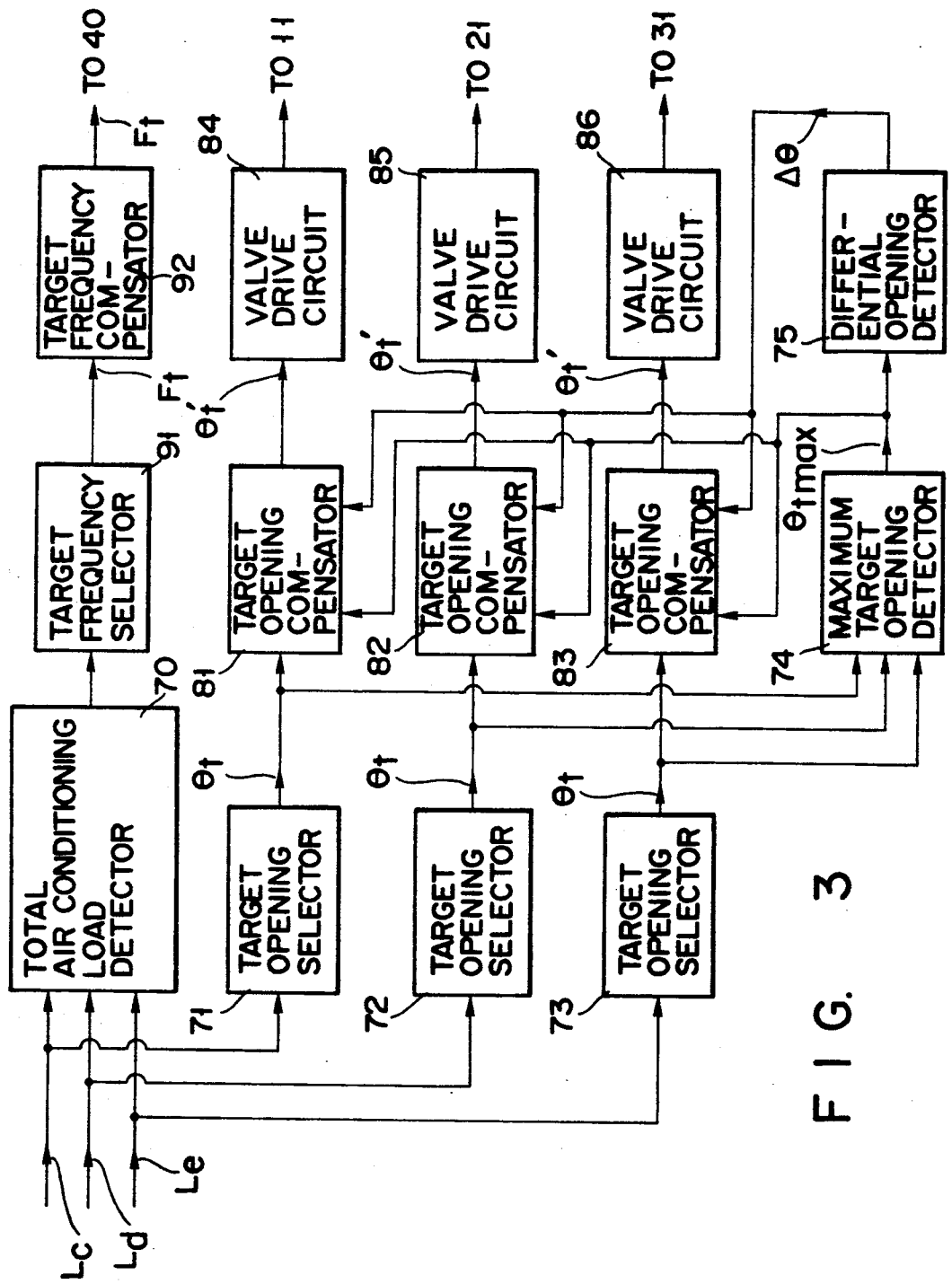
FIG. 3 is a block diagram showing the concrete arrangement of a multi-control in the first preferred embodiment of the present invention.
Figure 4:
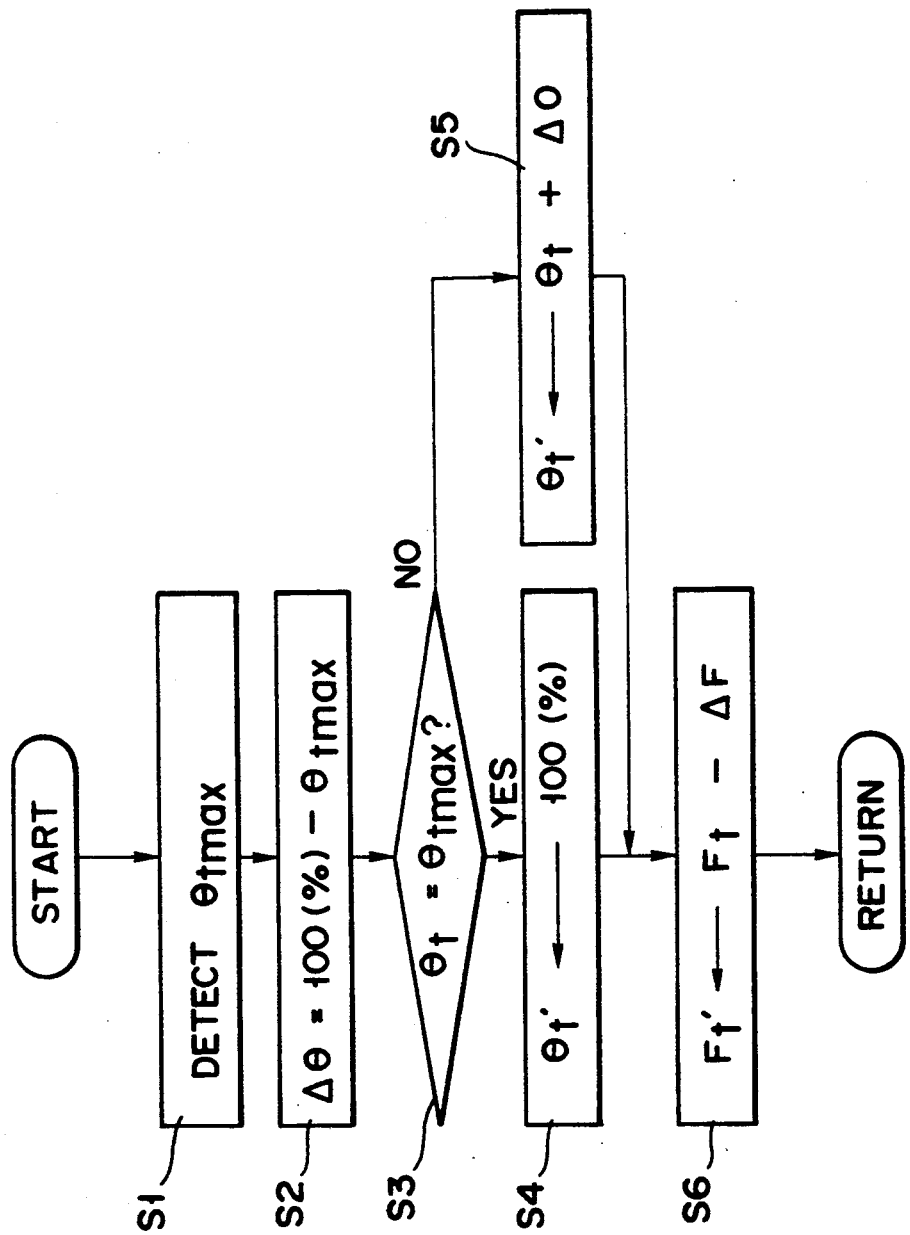
FIG. 4 is a flowchart illustrating how the first preferred embodiment of the present invention works.

Presented in FIG. 3 is a preferred embodiment of the multi-control (50).

The data of respective air-conditioning loads (Lc), (Ld), and (Le) is input to a total air-conditioning load detector (70), and respective target opening selectors (71), (72), and (73); the total air-conditioning load detector (70) detects the total of air-conditioning loads (Lc), (Ld), and (Le).

The target opening selectors (71), (72), and (73) select each a target opening ($\theta t$) for each of the flow control valves (11), (21), and (31) according to the magnitude of each air-conditioning load — (Lc), (Ld) and (Le).

The data of each target opening ($\theta t$) selected by each of the target opening selectors (71), (72), and (73) is transmitted to a maximum target opening detector (74), whereat the maximum target opening ($\theta t_{max}$) is detected out of respective target openings ($\theta t$).

The data of the maximum target opening ($\theta t_{max}$) detected thereby is input to an opening difference detector (75) which detects the difference ($\Delta \theta = 100 - \theta t_{max}$) between a full (100%) opening and the maximum target opening ($\theta t_{max}$).

The data of said detected opening difference ($\Delta \theta$) is fed to each of target opening compensators (81), (82), and (83).

Where each of respective target opening ($\theta t$) agrees with the maximum target opening ($\theta t_{max}$), the target opening compensators (81), (82), and (83) make up for the individual target openings ($\theta t$) up to the full opening (100%).

Meanwhile when each target opening ($\theta t$) fails to match the maximum opening ($\theta t_{max}$), the opening compensators (81). (82), and (83) each make up for said each target opening ($\theta t$) up to such an opening as is greater by said differential opening ($\Delta \theta$).

The consequences of compensation done by the opening compensators are each sent out as a compensated target opening ($\theta t'$) to respective valve drive circuits (84), (85), and (86).

The valve drive circuit (84), (85), and (86) feel as many drive pulses as corresponds to the compensated target opening ($\theta t'$) to each of the flow control valves (11), (21). and (31) so that these flow control valves (11), (21) and (31) will be driven.

The outcome of detection by said total air-condition load detector (70) is transmitted to a target frequency selector (91) which selects how much is the target frequency (Ft) of the current output from the inverter (41) according to the result of detection by the total air-conditioning load detector (70). A selected value of the target frequency (Ft) is fed to a target frequency compensator (92).

The target frequency compensator (92) decrementally makes up for the target frequency (Ft) by a given value ($\Delta F$), and the result of compensation done by said target frequency compensator is transmitted as a compensated target frequency (Ft') to the outdoor control (40).

Next, with reference to FIGS. 4 through 7, the functions involved in said arrangement are illustrated hereunder.

At the indoor units (C), (D), and (E), their respective air-conditioning loads (cooling or heating loads) are calculated.

Figure 5:
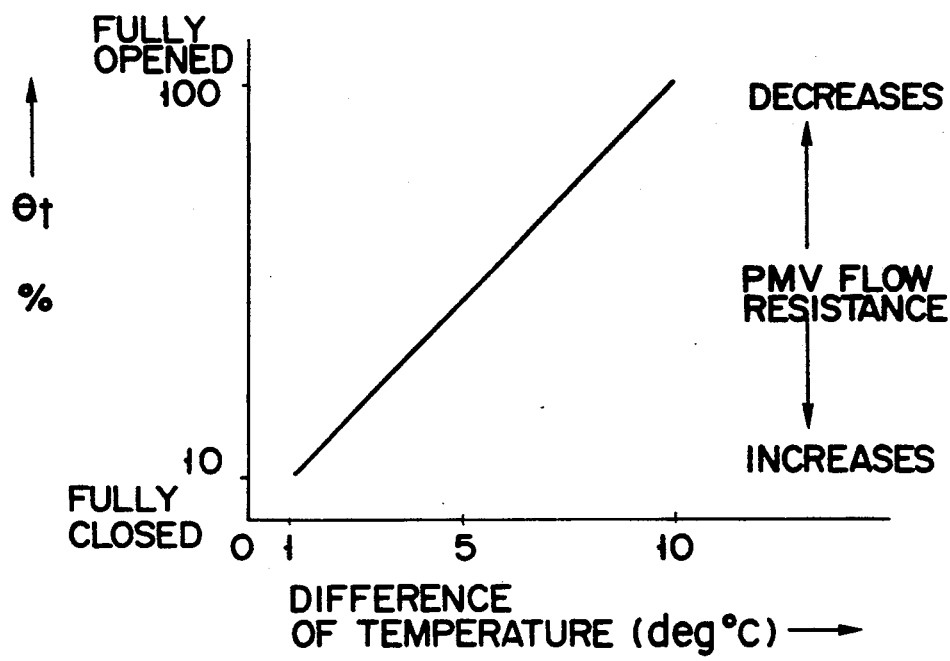
FIG. 5 is a graph showing the relationship between an air-conditioning load in the case of each preferred embodiment of the present invention, and a target opening ($\theta t$) of the flow control valve.

According to the calculations of said respective air-conditioning loads, the flow control valves (11), (21), and (31) have their target openings ($\theta t$) selected optimally, following the calculations of said respective air-conditioning loads (Lc), (Ld), and (Le) (see FIG. 5).

Subsequently, out of individual target openings ($\theta t$), the maximum target opening ($\theta t_{max}$) is detected (step (S1)), and further, the difference ($\Delta\theta = 100 - \theta t_{max}$) between the maximum target opening ($\theta t_{max}$) and the full opening (100%) is detected (step (S2)).

Thereafter, each target opening ($\theta t$) and the maximum target opening ($\theta t_{max}$) are compared with one another (step (S3)).

In case where the target opening ($\theta t$) matches the maximum target opening ($\theta t_{max}$), the former ($\theta t$) is compensated for up to the full opening (100%) (step (S4)).

In the event the target opening ($\theta t$) fails to match the maximum target opening ($\theta t_{max}$), the former ($\theta t$) is incrementally compensated for as much as said differential opening ($\Delta\theta$) (step (S5)).

The table below gives an example showing how the compensation of flow control valve opening is effected.

|   | Temperature difference (deg °C.) | $\theta t$ | $\theta t'$ |
|---|---|---|---|
| C | 7 | 70% | 100% |
| D | 6 | 60% | 90% |
| E | 5 | 50% | 80% |

Precisely with the case quoted above, the flow control valve (11) corresponding to the indoor unit (C) with the largest air-conditioning load is fully opened (100% opening). Meanwhile, actual openings ($\theta$) respectively of the flow control valves (21) and (31) corresponding to the indoor units (D) and (E) are set larger by an increment of $\Delta\theta$ opening (= 30%).

Namely, it is practicable that the openings respectively of the flow control valves (11), (21), and (31) are increased while optimal distribution of refrigerant to the indoor units (C), (D), and (E) is maintained. Therefore, it is feasible to lessen the flow resistance inside the refrigerant piping during the refrigeration cycle, with the load imposed on the compressor (1) thereby decreased.

It is further noted that the target frequency (Ft) is selected according to the total of respective air-conditioning loads (Lc), (Ld), and (Le); provided, the target frequency (Ft) is decrementally compensated for by a given value ($\Delta F$), thus becoming a compensated target frequency (Ft') (= Ft $-$ $\Delta F$) (step (S6)).

The outdoor control (40) regulates the inverter (41) so that the actual frequency (F) of the current output from said inverter will coincide with the compensated target frequency (Ft').

Namely, the capacity of the compressor (1) is decrementally varied as much reduction as in the load of the compressor (1) resulting from the decreases said flow resistance falls.

Figure 6:
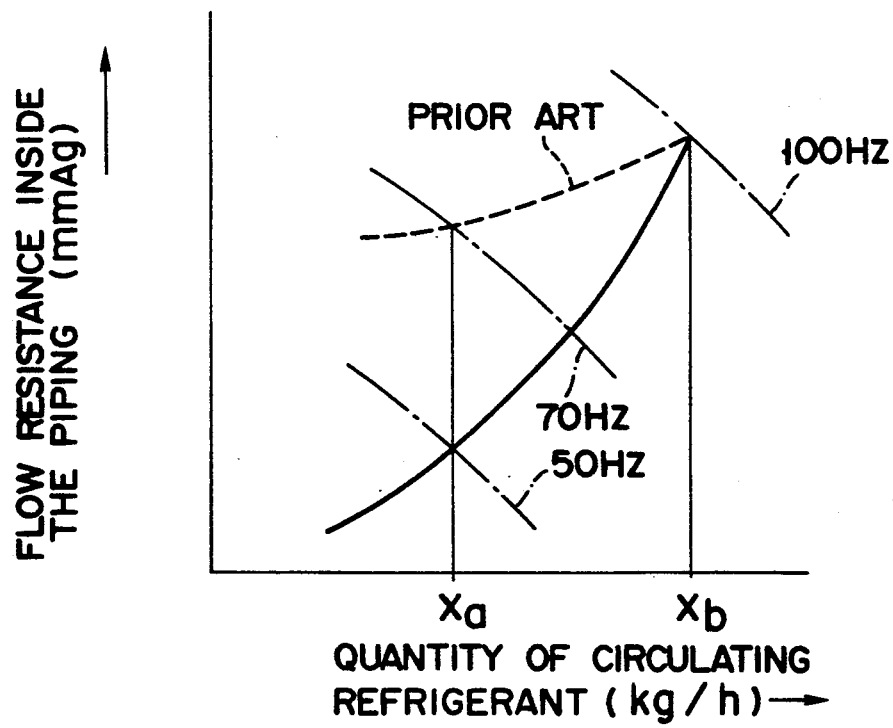
FIG. 6 is a graph showing the relationship between a flow resistance inside the refrigerant piping during the refrigeration cycle in each preferred embodiment of the present invention, and the quantity of circulating refrigerant.

Now, reference is made to FIG. 6 showing the relationship between the flow resistance inside the refrigerant piping during the refrigeration cycle, and the quantity of circulating refrigerant. Noting said relationship, it is apprehended that, whereas an inverter output current frequency of 70 Hz used to be required in the prior arts to assure a circulating quantity (Xa) of refrigerant, in this preferred embodiment of the present invention, 50 Hz suffices to ensure the circulating quantity (Xa) of refrigerant.

Figure 7:
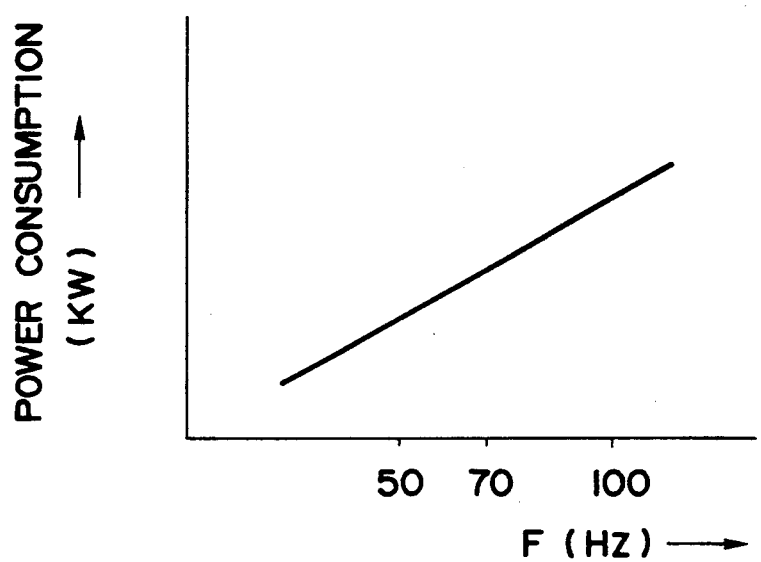
FIG. 7 is a graph showing the relationship between an inverter output frequency (F) and the consumption of power in each preferred embodiment of the present invention.

Practicability to decrementally vary the capacity of the compressor (1) as quoted above is serviceable to lessen the consumption of power as shown in FIG. 7, whereby the efficiency of energy saving may be raised.

The second preferred embodiment of the present invention is described hereunder.

The multi-control (50) of the second preferred embodiment is functionally different from that used in the first embodiment of the present invention, with other arrangements that the functional one of the former remaining identical with those of the latter.

Figure 8:
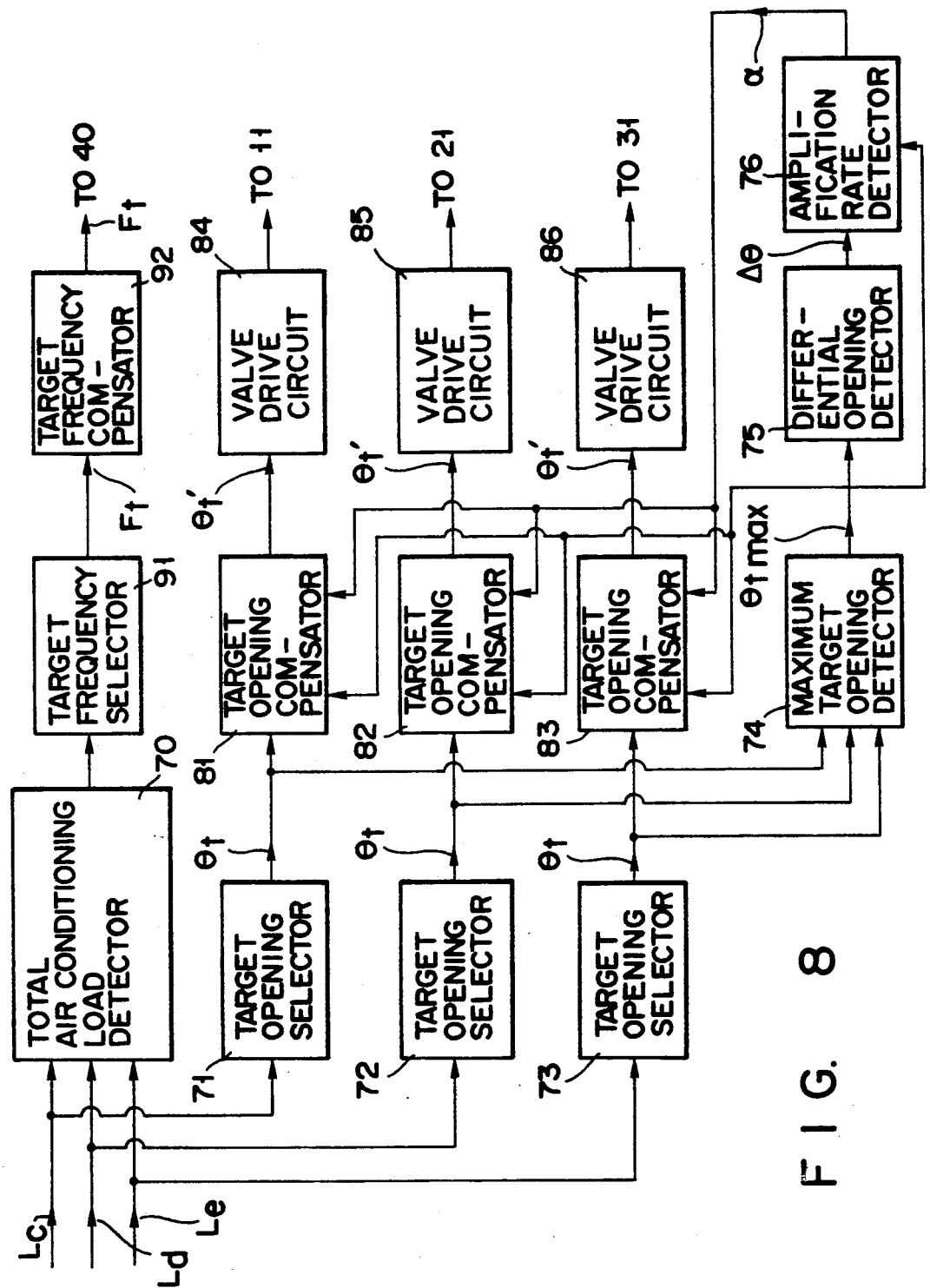
FIG. 8 is a block diagram showing the concrete arrangement of a multi-control in the second preferred embodiment of the present invention.

Namely, as shown in FIG. 8, the data of the maximum target opening ($\theta t_{max}$) detected by the maximum target opening detecting (74) is sent out to an amplification rate detector (76). Further fed to this amplification rate detector (76) is the data of the differential opening ($\Delta\theta$) detected by the differential opening detector (75).

The amplification rate detector (76) detects a ratio ($\alpha$) (= $\Delta\theta/\theta t_{max}$) of the differential opening ($\Delta\theta$) to the maximum target opening ($\theta t_{max}$). Said ratio ($\alpha$) corresponds to the rate of amplifying the opening of the flow control valve to be fully opened. Hereinafter, the ratio ($\alpha$) is called an amplification rate ($\alpha$).

Each detected amplification rate ($\alpha$) is transmitted to the respective target opening compensators (81), (82), and (83).

Where each of respective target openings ($\theta t$) concurs with the maximum target opening ($\theta t_{max}$), each of the target opening compensators (81), (82), and (83) makes up for said target opening ($\theta t$) up to the full opening (100%). On the other hand when each target opening ($\theta t$) does not coincide with the maximum target opening ($\theta t_{max}$), the target opening compensators (81), (82), and (83) make up for respective target openings ($\theta t$) incrementally as much as a multiple of the amplification rate ($\alpha$).

Figure 9:
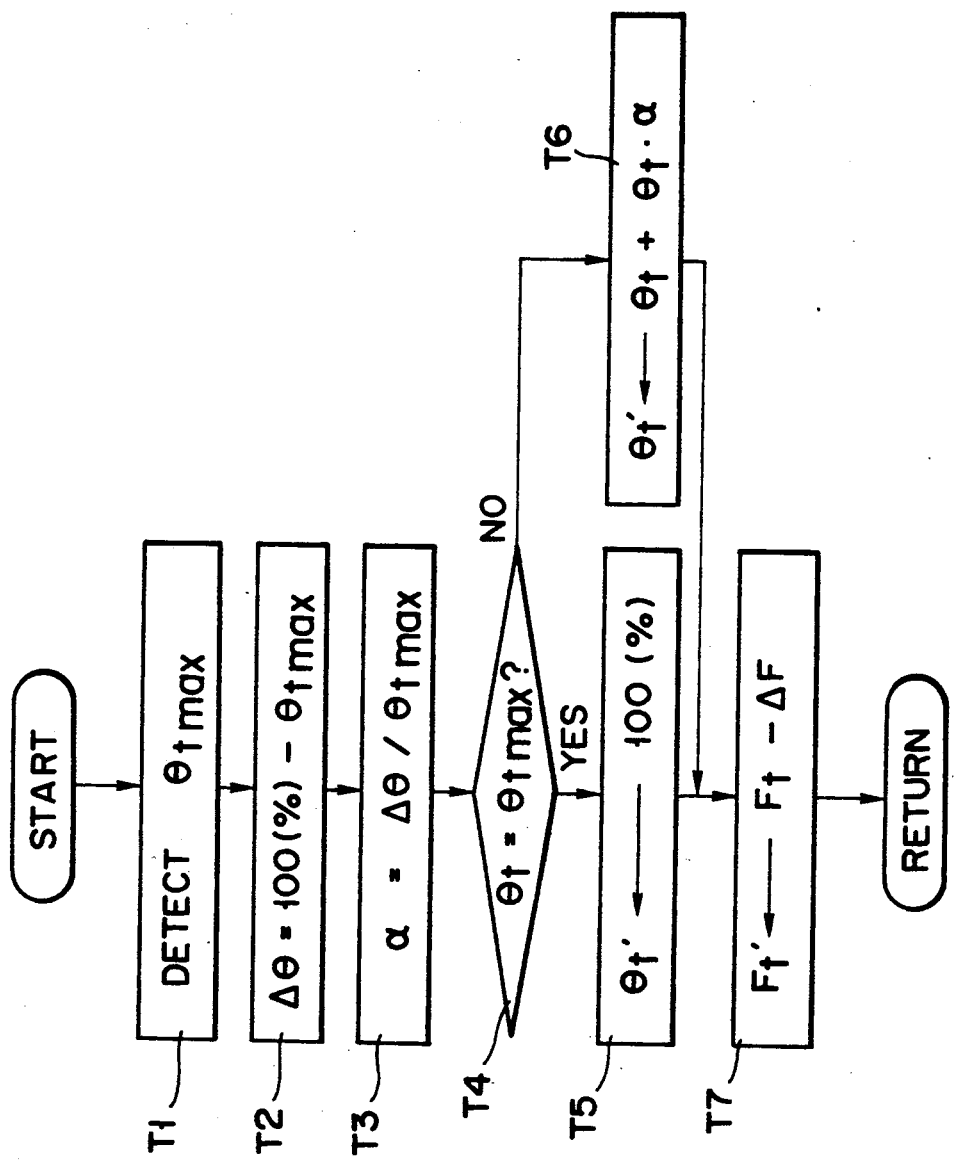
FIG. 9 is a flowchart illustrating how the second preferred embodiment of the present invention works.

With reference to FIG. 9, the functions concerned are described hereunder.

Of individual target openings ($\theta t$), the maximum target opening ($\theta t_{max}$) is first detected (step (T1)), and subsequently, the differential opening ($\Delta\theta$) (= 100 $-$ $\theta t_{max}$) between the maximum target opening ($\theta t_{max}$) and the full opening (100%) is detected (step (T2)).

Following the differential opening ($\Delta\theta$) and the maximum target opening ($\theta t_{max}$), the amplification rate ($\alpha$) (= $\Delta\theta/\theta t_{max}$) is figured out (step (T3)).

Then, each target opening ($\theta t$) and the maximum target opening ($\theta t_{max}$) are compared with one another (step (T4)).

A case where each target opening ($\theta t$) matches the maximum target opening ($\theta t_{max}$) entails incrementally compensating for said each target opening ($\theta t$) up to the full opening (100%) (step (T5)). The opening amplification rate obtained in this case corresponds to the amplification rate ($\alpha$) calculated in step (T3).

A contrary case where each target opening ($\theta t$) does not agree with the maximum target opening ($\theta t_{max}$) results in compensating said each target opening ($\theta t$) incrementally as much as multiple (= $\theta t + \theta t \cdot \alpha$) of the amplification rate ($\alpha$).

For example, when the air-conditioning load (Lc) of the indoor unit (C) is the largest, the flow control valve (11) is fully opened (100% opening) while the actual openings ($\theta$) respectively of the flow control valves (21) and (31) corresponding to the remaining indoor units (D) and (E) are set each to such a value greater than the target opening ($\theta$t) by the product of the amplification rate ($\alpha$) and said target opening ($\theta$t).

Namely, it is whereby feasible to increase the openings of the flow control valves (11), (21), and (31) with optimal distribution of refrigerant respectively to the indoor units (C), (D), and (E) maintained. Therefore, the flow resistance inside the refrigerant piping during the refrigeration cycle is decreased, whereby the load imposed on the compressor (1) may be lessened.

Then, the target frequency (Ft) of the current output from the inverter (41) is selected according to the total of air-conditioning loads (Lc), (Ld), and (Le); provided, the target frequency (Ft) is made up for decrementally as much as a given value ($\Delta$F), becoming a compensated target frequency (Ft') (= Ft − $\theta$F) (Step (T7)).

The outdoor control (40) regulates the inverter (41) in a way that the actual frequency (F) of the current output from the inverter may coincides with the compensated target frequency (Ft').

Namely, the capacity of the compressor (1) is decrementally varied as much reduction as in the load of the compressor (1) stemming from the decrease of said flow resistance.

Such decrementally varying the capacity of the compressor (1) is serviceable to lessen the consumption of power as shown in FIG. 7, whereby it becomes practicable to raise the efficiency of energy saving.

Next, the third preferred embodiment of the present invention is described hereunder.

The multi-control (50) of the third preferred embodiment is functionally different from that used in the first preferred embodiment of the present invention, with other arrangements than the functional one of the former remaining identical with those of the latter.

Figure 10:
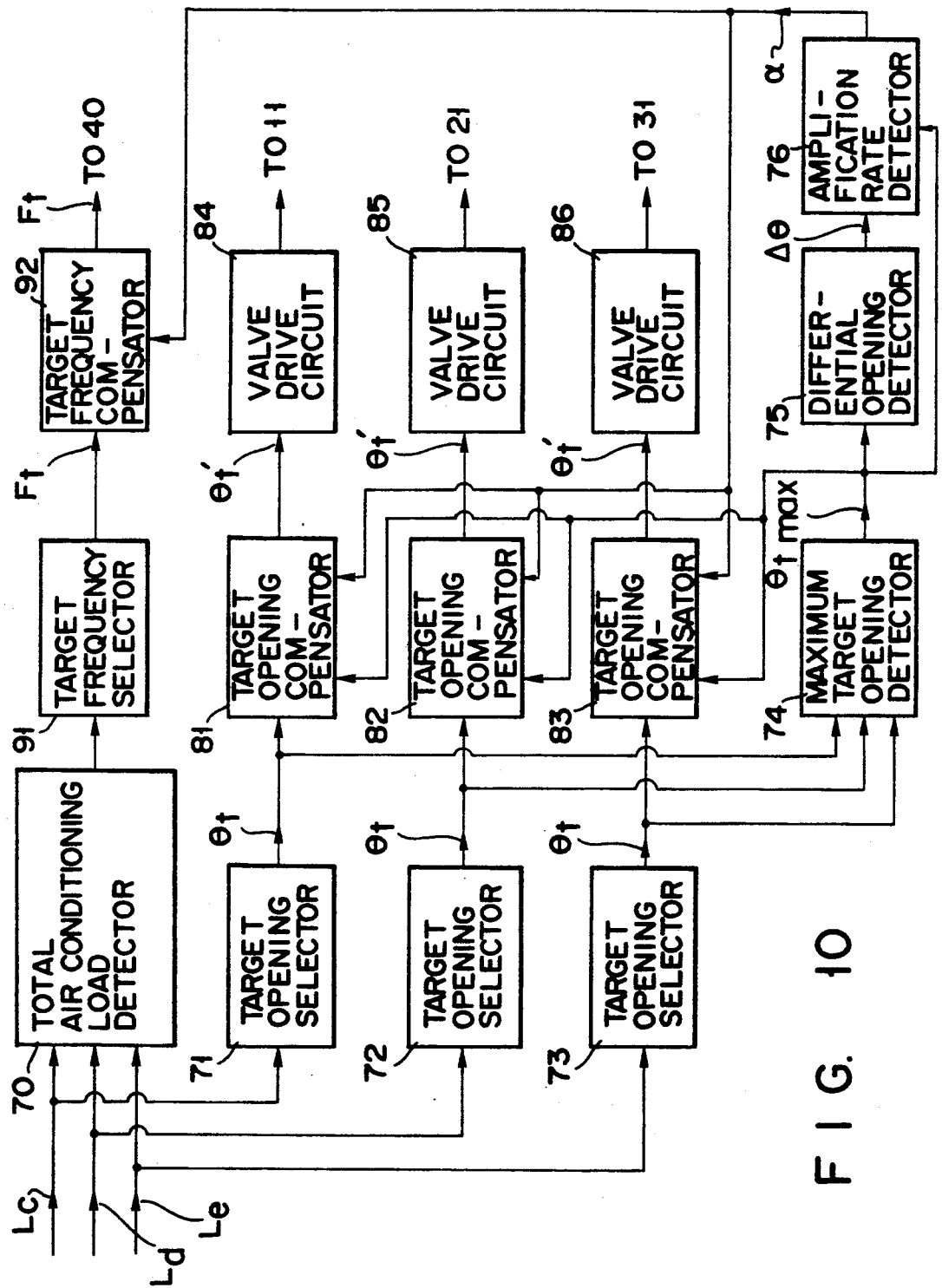
FIG. 10 is a block diagram showing the concrete arrangement of a multi-control in the third preferred embodiment of the present invention.

Namely, as shown in FIG. 10, the data of the maximum target opening ($\theta t_{max}$) detected by the maximum target opening detector (74) is sent out to the amplification rate detector (76). Further, the data of the differential opening ($\Delta\theta$) detected by the differential opening detector (75) is fed to the amplification rate detector (76).

Subsequently, the amplification rate detector (76) detects a ratio ($\alpha$) (= $\Delta\theta/\theta_{max}$) of the differential opening ($\Delta\theta$) to the maximum target opening ($\theta t_{max}$). Said ratio ($\alpha$) corresponds to the rate of amplifying the opening of the flow control valve to be opened fully. Hereinafter, the ratio ($\alpha$) is called an amplification rate ($\alpha$).

Each detected amplification rate ($\alpha$) is transmitted to the respective target opening compensators (81), (82), (83), and a target frequency compensator (92).

In case the individual target openings ($\theta$t) each match the maximum target opening ($\theta t_{max}$), the target opening compensators (81), (82), and (83) make up for said individual target openings ($\theta$t) up to the full opening (100%). Meanwhile when the target opening ($\theta$t) does not coincide with the maximum target opening ($\theta t_{max}$), *each of the target opening compensators (81), (82), and (83) makes up for said target opening ($\theta$t) incrementally as much as a multiple of the amplification rate ($\alpha$) and said target opening ($\theta$t).*

The target frequency compensator (92) makes up for the target frequency (Ft) decrementally as much as a multiple of said target frequency (Ft) and a frequency amplification rate ($\alpha$). The consequence of said compensation is transferred as a compensated target frequency (Ft') to the outdoor control (40).

Figure 11:
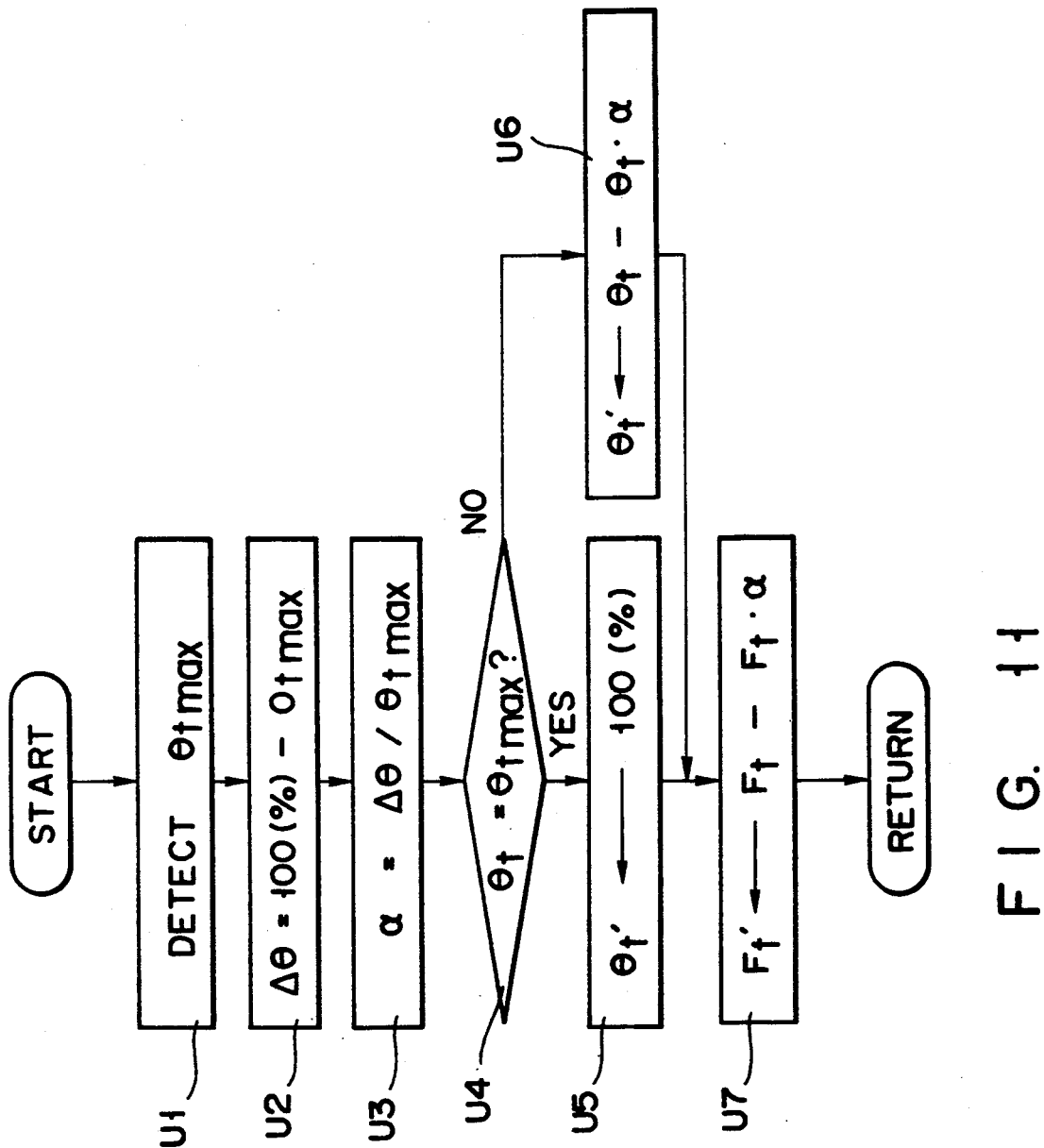
FIG. 11 is a flowchart illustrating how the third preferred embodiment of the present invention works.

Referring to FIG. 11, the functions concerned are described hereunder.

Of individual target openings ($\theta$t), the maximum target opening ($\theta t_{max}$) is first detected (step (U1)), and subsequently, the differential opening ($\Delta\theta$) (= 100 − $\theta t_{max}$) between the maximum target opening ($\theta t_{max}$) and the full opening (100%) is detected (step (U2)).

Based on the differential opening ($\Delta\theta$) and the maximum target opening ($\theta t_{max}$), the amplification rate ($\alpha$) (= $\Delta\theta/\theta t_{max}$) is figured out (step (U3)).

Then, each target opening ($\theta$t) and the maximum target opening ($\theta t_{max}$) are compared with one another (step (U4)).

A case where each target opening ($\theta$t) concurs with the maximum target opening ($\theta t_{max}$) results in compensating for said each target opening ($\theta$t) up to the full opening (100%) (step (U5)).

The opening amplification rate obtained in this case corresponds to the amplification rate ($\alpha$) calculated in step (U3).

An opposite case where each target opening does not agree with the maximum target opening ($\theta t_{max}$) entails incrementally compensating for said each target opening as much as multiple (= $\theta$t + $\theta$t · $\alpha$) of the amplification rate ($\alpha$) and said target opening ($\theta$t) (step (U6)).

For example, when the air-conditioning load (Lc) of the indoor unit (C) is the greatest, the flow control valve (11) is fully opened (100% opening). Meanwhile, the actual openings ($\theta$) respectively of the flow control valves (21) and (31) matching the indoor units (D) and (E) are set each to such a value greater than the target opening ($\theta$t) by a multiple of the amplification rate ($\alpha$) and said target opening.

Namely, it is hereby feasible to increase the openings of the flow control valves (11), (21), and (31) with the distribution of refrigerant respectively to the indoor units (C), (D), and (E) maintained optimally. Therefore, the flow resistance inside the refrigerant piping during the refrigeration cycle can be decreased, whereby the load imposed on the compressor (1) can be lessened.

Then, the target frequency (Ft) of the current output from the inverter (41) is selected according to the total of air-conditioning loads (Lc), (Ld, and Le); provided, selecting the target frequency (Ft) is implemented so that Ft will become a compensated target frequency (Ft') (= Ft − Ft × $\alpha$) through a decremental compensation as much as a multiple of the amplification rate ($\alpha$) and said target frequency (Ft) (step (U7)).

The outdoor control (4) controls the inverter (41) in a way that the actual frequency of the current output from the inverter (41) may coincide with the compensated target frequency (Ft').

Namely, the capacity of the compressor (1) is decrementally varied as much reduction as in the load of the compressor (1) due to the decrease of said flow resistance.

Such decrementally varying the capacity of the compressor (1) is serviceable to lessen the consumption of power as shown in FIG. 7, whereby it becomes practicable to raise the efficiency of energy saving.

Next, the fourth preferred embodiment of the present invention is described hereunder.

The multi-control (50) of the fourth preferred embodiment is functionally different from that used in the first preferred embodiment of the present invention, with other arrangements than the functional one of the former remaining identical with those of the latter.

Figure 12:
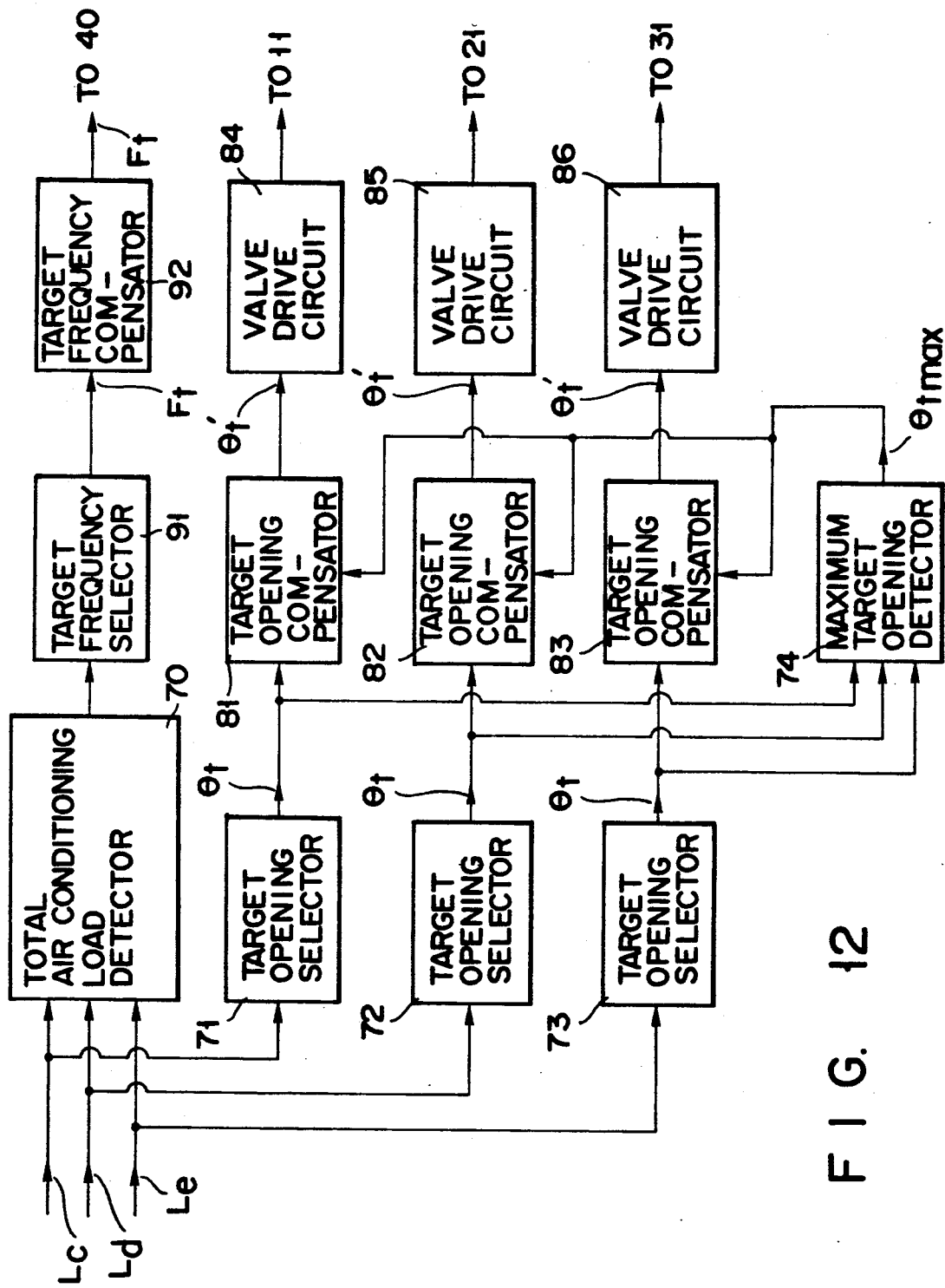
FIG. 12 is a block diagram showing the concrete arrangement of a multi-control in the fourth preferred embodiment of the present invention.

Namely, as shown in FIG. 12, the data of the maximum target opening ($\theta t_{max}$) only detected by the maximum target opening detector (74) is transferred to the target opening compensators (81), (82), and (83). In the fourth preferred embodiment, the differential opening detector (75) employed in the first preferred embodiment is eliminated.

In case where each target opening ($\theta t$) matches the maximum target opening ($\theta t_{max}$), the target opening compensators (81), (82), and (83) make up for respective target openings ($\theta t$) incrementally as much as a given value ($\Delta \theta a$). Meanwhile when the target opening ($\theta t$) does not concur with the maximum target opening ($\theta t_{max}$), the target opening compensators (81), (82), and (83) make up for the respective target openings incrementally as much as a given value ($\Delta \theta b$) ($< \Delta \theta a$).

Figure 13:
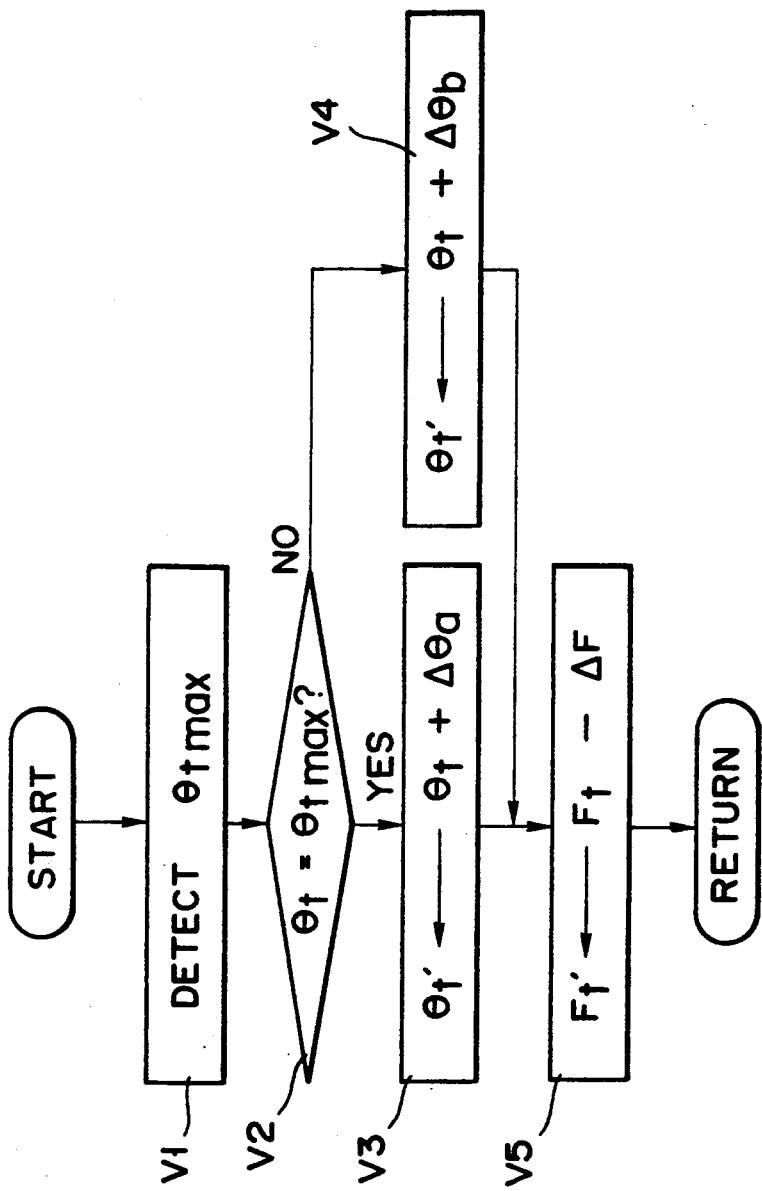
FIG. 13 is a flowchart illustrating how the fourth preferred embodiment of the present invention works.

With reference to FIG. 13, the functions concerned are described hereunder.

Of individual target openings ($\theta t$), the maximum target opening ($\theta t_{max}$) is first detected (step (V1)), and subsequently, the maximum target opening ($\theta t_{max}$) and each target opening ($\theta t$) are compared with one another (step (V2)).

A case where each target opening ($\theta t$) coincides with the maximum target opening ($\theta t_{max}$) results in incrementally compensating for said each target opening ($\theta t$) by a given value ($\Delta \theta a$) (step (V3)).

Another case where each target opening ($\theta t$) does not agree with the maximum target opening ($\theta t_{max}$) entails incrementally compensating for said each target opening ($\theta t$) by a given value ($\Delta \theta b$) ($< \Delta \theta a$) (step (V4)).

For example, when the air-conditioning load (Lc) is the largest, the flow control valve (11) has its opening set greater than the target opening ($\theta t$) by a given value ($\Delta \theta a$) while the actual openings ($\theta$) respectively of the flow control valves (21) and (31) matching the remaining indoor units (D) and (E) are set each to such a value greater than the target opening ($\theta t$) by a given value ($\Delta \theta b$).

Namely, it is whereby feasible to increase the openings of the flow control valves (11), (21), and (31) with the distribution of refrigerant respectively to the indoor units (C), (D), and (E) maintained optimally. Therefore, the flow resistance inside the refrigerant piping during the refrigeration cycle can be decreased, whereby the load imposed on the compressor (1) can be lessened.

Then, the target frequency (Ft) of the current output from the inverter (41) is selected according to the total of air-conditioning loads (Lc), (Ld) and (Le); provided, of target frequency (Ft) is made up for decrementally as much as a given value ($\Delta f$), becoming a compensated target frequency (Ft') (= Ft − $\Delta F$) (step (V5)).

The outdoor control (40) controls the inverter (41) in a way that the actual frequency (F) of the current output from the inverter (41) may coincides with the compensated target frequency (Ft').

Namely, the capacity of the compressor (1) is decrementally varied as much reduction as in the load of the compressor (1) stemming from the decrease of side flow resistance.

Such decrementally varying the capacity of the compressor (1) is serviceable to lessen the consumption of power as shown in FIG. 7, whereby it becomes practicable to raise the efficiency of energy saving.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A multi-type air-conditioning system with an outdoor unit coupled to a plurality of indoor units comprising:
 an inverter to provide output power of a given frequency, said inverter being mounted in said outdoor unit;
 a compressor motor starting to run in response to the receipt of said output power from said inverter, and whose running speed is variable according to the frequency of said output power from said inverter, the compressor motor being mounted in said outdoor unit;
 a capacity-variable compressor driven by said compressor motor to take in refrigerant, compress thereof, an deliver said compressed refrigerant, said capacity-variable compressor being installed in said outdoor unit;
 an outdoor heat exchanger to interchange the heat of inflow refrigerant with the heat of outdoor air, said outdoor heat exchanger being mounted in said outdoor unit;
 a plurality of indoor heat exchangers, each to interchange the heat of inflow refrigerant with the heat of indoor air, said plurality of indoor heat exchangers being provided respectively in said plurality of indoor unit;
 a plurality of flow control valves, each to control the flow of refrigerant running through each of said plurality of indoor heat exchangers;
 a refrigeration cycle with said capacity-variable compressor, said outdoor heat exchanger, each of said plurality of flow control valves, and each of said plurality of indoor heat exchangers coupled together and held in combined service;
 means to detect an air-conditioning load of each of said indoor units;
 means to separately select a target opening ($\theta t$) of each of said plurality of flow control valves according to said air-conditioning load of said each indoor unit;
 means to fully open the flow control valve which will have a maximum target opening ($\theta t_{max}$) selected out of individual said target openings;
 means to increase an actual opening ($\theta$) of each of those flow control vales, other than said flow control valve due to be fully opened, by a given value ($\Delta \theta$);
 means to select a target frequency (Ft) of output power from said inverter according to the total of respective air-conditioning loads of said indoor units; and
 means to lessen an actual frequency (F) of said output power of said inverter lower than said target frequency (Ft) by a given value ($\Delta F$).

2. The system according to claim 1, further comprising a distributor unit provided in a joint pipe interposed between said outdoor unit, and said plurality of indoor units.

3. The system according to claim 2, wherein said plurality of flow control valves are provided in said distributor unit.

* * * * *